A. B. JOHNSON.
DEVICE FOR USE IN STUDYING PICTORIAL COMPOSITION.
APPLICATION FILED FEB. 15, 1908.
902,299.
Patented Oct. 27, 1908.
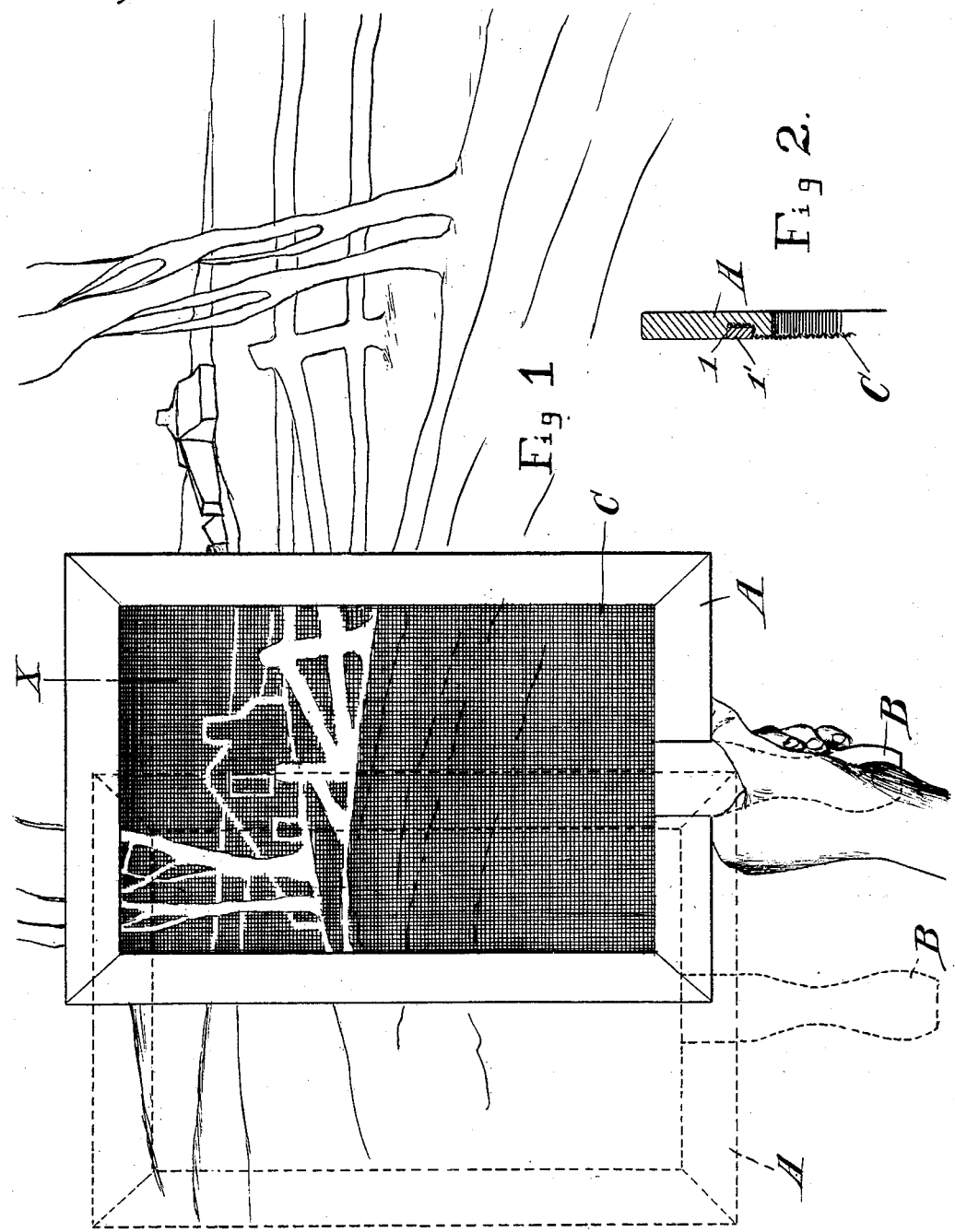
Witnesses:
A.W. Nelson
John R. Laporte
Inventor:
Ada B. Johnson
by 
Atty.

UNITED STATES PATENT OFFICE.

ADA BENEDICTA JOHNSON, OF CHICAGO, ILLINOIS.

DEVICE FOR USE IN STUDYING PICTORIAL COMPOSITION.

No. 902,299. Specification of Letters Patent. Patented Oct. 27, 1908.

Application filed February 15, 1908. Serial No. 416,093.

*To all whom it may concern:*

Be it known that I, ADA BENEDICTA JOHNSON, a citizen of the United States, and a resident of Chicago, Cook county, Illinois, have invented a certain new, useful, and Improved Device for Use in Studying Pictorial Composition, of which the following is a full, clear, and exact description, such as will enable others skilled in the art to which it appertains to make and use the same.

My invention relates to improvements in educational devices and has particular reference to an improved device for use by artists and their students in studying pictorial composition.

The object of my invention is to provide a small, light, portable device which may be carried from place to place by the student and used as a means for finding the subject matter for pictures and the best arrangement of the subject or composition within the outlines of a frame.

My invention consists of a device to be held in the hand and comprises a frame, containing an opening; in combination with a metallic netting stretched upon the frame through which the subject or landscape may be viewed and upon which the student may draw the principal lines of the view presented.

More specifically defined, the invention comprises a broad rectangular frame preferably having a handle, in combination with a metal screen or fabric arranged in the frame and preferably flush with or in the plane of one side of the frame, to permit the screen to be laid against the paper or canvas to which a transfer is to be made, after lines have been drawn on the screen as aforesaid.

My invention will be more readily understood by reference to the accompanying drawings, forming a part of this specification and in which;

Figure 1 discloses a landscape and my novel subject finder as it appears in use; and Fig. 2 is a sectional view of the device on the line X of Fig. 1, showing the metal fabric or screen in the plane of one side of the frame.

Referring to the drawings, A represents a broad frame, preferably having a handle, B. A piece of screen wire, C, is secured to the frame in such manner that it is flush with or in the plane of one side of the frame. This will be more readily understood by reference to Fig. 2. As there shown, the frame, A, contains a groove, 1, and the screening, C, is secured therein by strips, 1', sunk in the groove, 1.

The method of using the device is as follows: The frame A is held in such a position that the pupil may look therethrough. The broad frame blocks out or locates a portion of the landscape and presents the view to the observer as in a picture. By moving the device to various positions different parts of the landscape may be said to be thus framed and presented to the observer to the exclusion of the rest of the landscape, making it easy to determine what objects or particular portions of the landscape shall be incorporated in a properly composed picture. For example: Holding the device in the position shown by the full lines in the drawing a pleasing view is obtained, while if it were held in the position shown by the dotted lines even a child would realize that such composition would be poor. On selecting the proper composition or subject matter for a picture, the student holds the frame in the position selected and draws on the fabric what he sees in the frame. A few chalk marks suffice to represent the essential features of the composition. When the marks have been made on the fabric or screening, the student places the screen upon a piece of paper or canvas and by marking over the previous marks transfers the same thereto, the chalk passing readily through the meshes of the screen. The copy thus taken from the original drawing constitutes a record of the student's work and enables the teacher to intelligently instruct the student.

Having thus described my invention, I claim as new and desire to secure by Letters Patent:

1. A device for use in studying pictorial composition, comprising a relatively wide frame containing an opening, in combination with a metallic netting stretched upon the frame, flush with one side thereof, through which the subject or landscape may be viewed, upon which the student may draw the principal lines of the view presented and through which such lines may be transferred, substantially as described.

2. A device for use in studying pictorial composition, comprising a relatively wide frame having an opening and provided with a handle, in combination with a metallic netting stretched upon the frame, flush with one side thereof, through which the subject or landscape may be viewed, upon which the student may draw the principal lines of the view presented and through which such lines may be transferred, substantially as described.

In testimony whereof, I have hereunto set my hand, this 29th day of January, 1908, in the presence of two subscribing witnesses.

ADA BENEDICTA JOHNSON.

Witnesses:
M. SIMON,
F. G. KNIGHT.